Sept. 1, 1925.    A. J. FARMER    1,551,548
LUBRICATING DEVICE
Filed Sept. 23, 1921    2 Sheets-Sheet 1
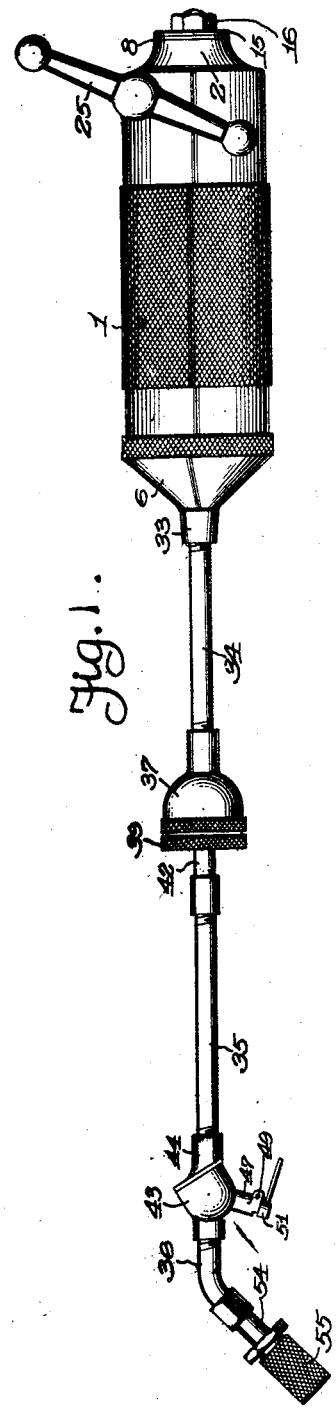
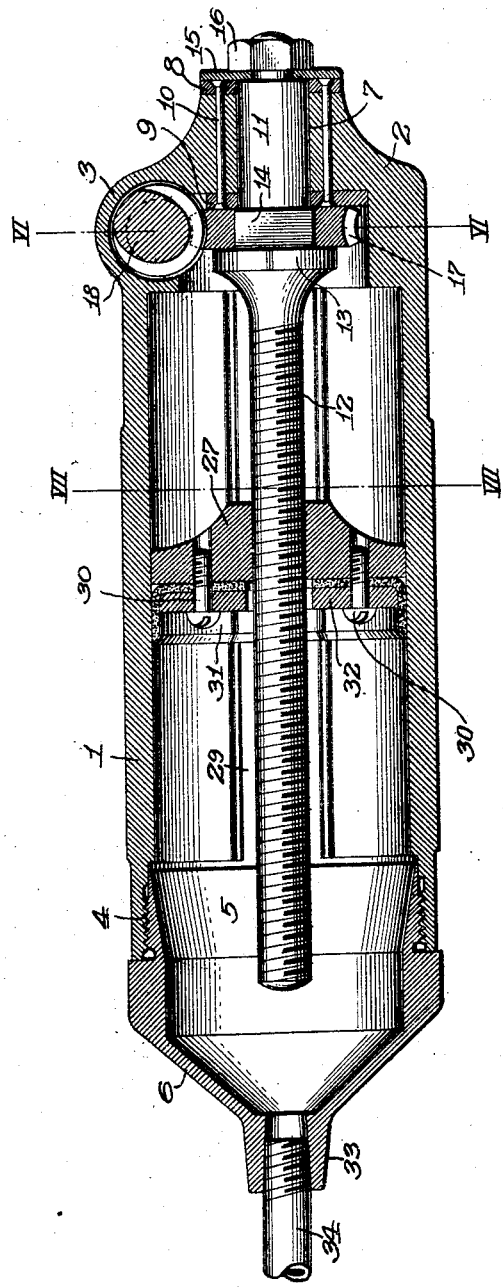
Inventor
Albert J. Farmer,
By
Attorneys

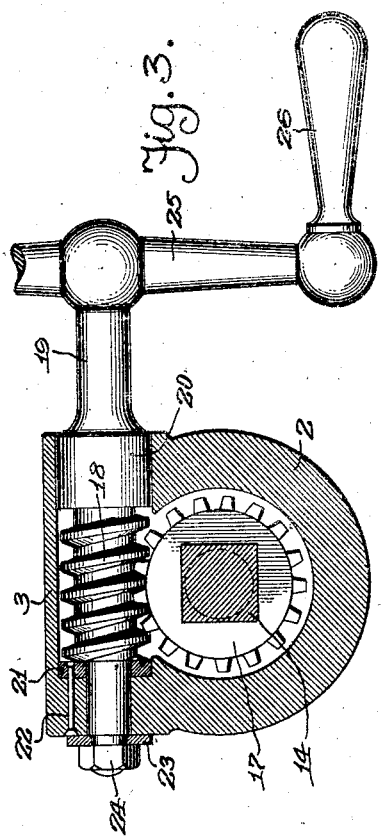
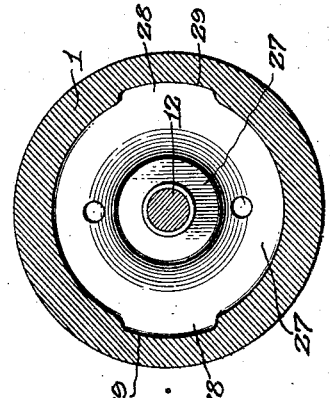
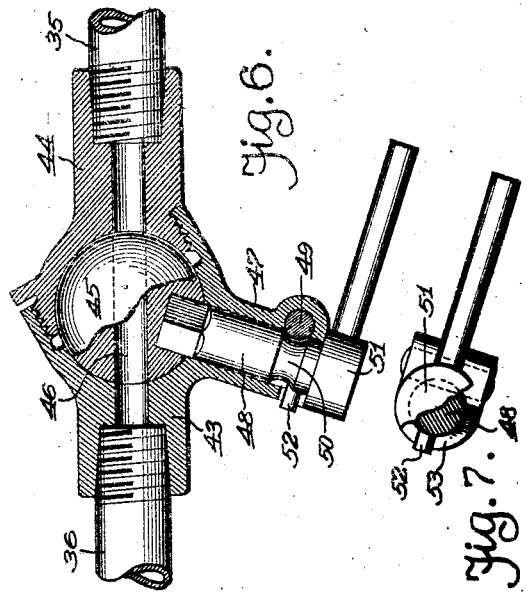
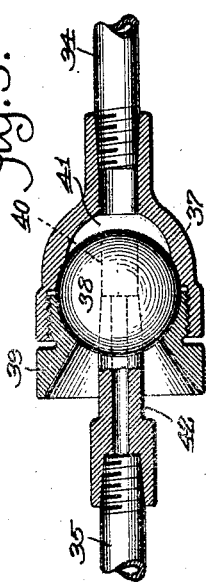

Patented Sept. 1, 1925.

1,551,548

UNITED STATES PATENT OFFICE.

ALBERT J. FARMER, OF DETROIT, MICHIGAN.

LUBRICATING DEVICE.

Application filed September 23, 1921. Serial No. 502,742.

*To all whom it may concern:*

Be it known that I, ALBERT J. FARMER, a citizen of the United States of America, residing at Detroit, in the county of Wayne and State of Michigan, have invented certain new and useful Improvements in Lubricating Devices, of which the following is a specification, reference being had therein to the accompanying drawings.

This invention relates to a lubricating device and has special reference to that class of devices by which a lubricant, as grease, or various grades of oil, may be forcibly injected into a bearing, grease cup, and between contacting, movable or wearing parts of machinery and automobiles or other vehicles, such devices being commonly styled grease "guns".

An ordinary grease gun embodies a cylinder or receptacle adapted to be filled with lubricant which is ejected from the cylinder by a screw reciprocated piston, and the cylinder is generally connected to the part to be lubricated by a hose or flexible conduit. This type of grease gun is not as perfect as it might be for lubricating purposes and the following disadvantages or defects might be considered.

First, the cylinder will leak when grease therein is subjected to pressure; second, a screw alone does not permit of a high degree of pressure on the lubricant which is often necessary in order to force the lubricant into a bearing or remote place; third, connections between the screw and piston within the cylinder are such that the adjustable parts will not withstand the wear and strain to which they are subjected; fourth, no provision has been made for closing the outlet conduit of a gun and relieve the pressure at the discharge when the grease therein is under pressure and consequently there is a waste, and fifth, the usual hose will not reach inaccessible parts and cannot be quickly coupled to a bearing or other part.

My invention aims to provide a grease gun by which the above noted and other disadvantages are eliminated; the improvements residing in the cylinder as well as the conduit. First, I provide a cylinder having a closure member which is positively sealed relative to the cylinder by pressure of lubricant therein and consequently the cylinder will not leak and cause soiling of the hands or clothing in handling the grease gun. Second, I use a screw and piston construction which will withstand hard usage and extreme pressures, especially with a power increasing device which I install in the outer end of the cylinder so that a lubricant within the cylinder can be placed under a high pressure to force the same into bearings, thus making the grease gun more effective as a lubricant ejector. Third, I provide a semi-rigid conduit consisting of articulated rigid sections that permit of the gun cylinder being easily and quickly connected to a bearing or the like at a remote point, and included in the conduit are novel universal couplings packed or maintained tight by internal pressure of lubricant so that there can be no leakage throughout the conduit. One of the universal couplings includes a valvular construction by which the conduit can be closed to prevent ejectment of lubricant and consequent loss when the conduit is disconnected from the part to which it is applied.

My invention further aims to provide a lubricating device wherein the parts are constructed with a view of reducing the cost of manufacture and at the same time retain those features by which durability, ease of operation, and cleanliness about such a device are secured. These and other ends are attained by a construction that will be hereinafter described and then claimed, and reference will now be had to the drawings, wherein Fig. 1 is a side elevation of the lubricating device or grease gun;

Fig. 2 is an enlarged longitudinal sectional view of the cylinder of the gun;

Fig. 3 is a cross sectional view taken on the line VI—VI of Fig. 2;

Fig. 4 is a similar view taken on the line VII—VII of Fig. 2;

Fig. 5 is an enlarged longitudinal sectional view of a universal coupling or connection forming part of the conduit of the lubricating device;

Fig. 6 is another view of a universal connection including a valve construction, and Fig. 7 is a detail view of the valve operating member shown in Fig. 6.

Reference will first be had to Figs. 2, 3 and 4 showing the lubricant ejector or gun, per se, said gun comprising a cylinder 1 having a head 2 and a transversely disposed worm housing 3 at its inner or closed end. The outer end of the cylinder is open with its interior wall screw-threaded, as at 4, to receive the exteriorly screw-threaded feather edge wall 5 of a cap or closure 6 which is removed when the cylinder 1 is to be filled with oil or packed with grease or other lubricant. The feather edge wall 5 of the cap 6 closely hugs the inner wall of the cylinder 1 and the pressure of lubricant within the cylinder will cause the feather edge of the wall to seal the connection between the cap and the cylinder and prevent grease from oozing out of the cylinder at the threaded joint between the cap and the cylinder.

The head 2 of the cylinder 1 is provided with an axial opening 7 and mounted against the inner and outer walls of the head 2, about the ends of the openings 7, are wear plates 8 and 9 attached to the head 2 by rivets 10 or other fastening means. The wear plates 8 and 9 are made of material more indurate than the material entering into the construction of the cylinder 1, which is preferably a die casting.

Journaled in the wear plates 8 and 9 and extending through the opening 7 is a cylindrical stem, 11 of a screw 12, said screw having a collar 13 and a rectangular shank 14 adjacent the stem 11. The outer end of the stem 11 is reduced to receive a washer 15 and a nut 16, said washer bearing against the wear plate 8. On the rectangular shank 14 and sandwiched between the collar 13 and the wear plate 9 is a worm wheel 17 meshing with a worm 18 journaled in the housing 3.

The worm 18 is part of a worm shaft 19 having a collar 20 journaled in an open end of the worm housing 3. The opposite end of the worm shaft extends through the opposite end of the worm housing and is journaled in a wear plate 21 riveted or otherwise connected, as at 22, to the end wall of the worm housing, said wear plate receiving any end thrust of the worm 18. A washer 23 and a nut 24 retains the worm shaft in the worm housing with the worm 18 constantly meshing with the worm wheel 17.

On the outer end of the worm shaft 19 is a crank 25 which may have a handle 26, either of which may be gripped by hand for rotating the worm shaft and imparting rotation to the screw 12 axially of the cylinder 1. By obtaining leverage through the crank 25 the screw 12 may be operated to produce high pressure within the cylinder 1, so that the contents of the cylinder may be subjected to a maximum pressure for injecting purposes.

In screwthreaded engagement with the screw 12 is a non-rotatable long bearing piston head 27 having opposed guide portions 28 extending into longitudinal grooves 29 provided therefor in the walls of the cylinder 1, the guide portions 28 cooperating with walls of the grooves 29 in preventing rotation of the piston head 27 during the operation of the screw 12, but not in the least interfering with reciprocation of the piston head 27 within the cylinder. Connected to the piston head 27 by screws 30 or other fastening means is a piston cup 31 and a retaining member 32, both having axial openings providing clearance for the screw 12. The piston cup 31 is made of leather or other suitable material and is preferably of a conventional form that snugly engages the inner walls of the cylinder 1 and prevents passage of lubricant between the piston and the cylinder. Since the piston head 27 affords a long bearing on the screw 12 said piston is firmly supported without any danger of the screw-threads being stripped and the piston becoming loose relative to the screw.

The cap 6 of the cylinder 1 has an outlet nipple 33 and connected thereto is a semi-rigid or multi-coupled conduit consisting of tubes or straight sections 34 and 35 and an elbow tube or section 36. The tube 34 is connected to the nipple 33 and connecting the tubes 34 and 35 is a universal connection, best shown in Fig. 5. The connection consists of a chambered socket member 37 containing a movable ball member 38 retained in the socket member 37 by a gland member 39 which is in screw-threaded engagement with the socket member 37 and may be adjusted to compensate for wear and maintain a non-leakable connection establishing communication between the tubes 34 and 35. The ball member 38 has an opening 40 communicating with a chamber 41 within the socket member 37, and mounted in one end of the opening 40 and extending out of the gland member 39 is a coupling member 42 to which the tube 35 is connected. It is therefore possible for grease to pass from the tube 34 through the universal connection into the tube 35 even though said tube is disposed at an angle to the tube 34. Pressure of grease in the chamber 41 will firmly seat the ball member 38 on the gland member 39 and prevent leakage of grease at the universal connection.

Another connection establishes communication between the straight tube 35 and the elbow tube 36, this connection being best shown in Figs. 6 and 7. It consists of a socket member 43 connected to the tube 36, a gland member 44 connected to the tube 35 and also to the socket member 43, and an adjustable ball member 45 between the socket and gland members. The adjustable ball member 45 has an opening 46 establishing communication between the tubes 35 and 36 and said ball member may be adjusted to close such communication and therefore forms part of a valve construction combined with the connection. The socket member 43 has an angularly disposed bonnet 47 for a rotatable valve or ball stem 48 which has its inner end mounted in the ball member 45 so that said stem may be used for rotating the ball member, to open or close the valve. The stem 48 is retained within the bonnet 47 by a transverse pin 49 engaging in a groove 50 of the stem and on the outer end of the stem is a crank or handle 51 by which the stem may be conveniently oscillated. To limit the oscillation of the stem 48 a pin or stud 52 of said stem extends into a segment-shaped recess or slot 53 of bonnet 47 and by the stud 52 engaging end walls of the slot 53 said stud will define the open and closed positions of the valvular ball member 45 of the connection. The advantages of this valve will hereinafter more fully appear.

The elbow tube 36 has a sleeve extension 54 to which is connected a coupling member 55.

With the valvular ball member 45 open and the cylinder 1 loaded with grease the worm shaft 19 can be revolved to shift the piston towards the outer end of the cylinder 1 and forcibly eject grease from the cylinder. The grease will pass through the conduit and enter the bearing or part to be lubricated. By virtue of the worm mechanism at the outer end of the cylinder 1 a high pressure may be obtained against the grease within the cylinder and the grease forced into the bearing. After this has been accomplished the valve contiguous to the outer end of the conduit may be closed with the valve serving two purposes. First, it will hold the grease under pressure within the groove after the conduit has been disconnected from the bearing or the part into which lubricant has just been forced. Second, cuts pressure off of connection, and when the conduit is uncoupled, obviates the necessity for retracting the piston in order to permit disconnection and prevents waste of grease from the conduit.

By using a semi-rigid or universally connected conduit I find that the cylinder 1 may be more conveniently supported relative to a bearing and the conduit more conveniently coupled to the bearing, and by using straight tube sections in the conduit there will be less friction and a better flow of grease compared to a hose. Since all parts of the lubricating device are made of metal and non-leakable the device can be maintained in a clean condition whereby an operator of the device will not have the hands and clothing unnecessarily soiled when lubricating an automobile or other machine.

While in the drawing there is illustrated a preferred embodiment of the invention, it is to be understood that the structural elements are susceptible to such changes, in size, shape and manner of assemblage, as fall within the scope of the appended claims.

What I claim is:—

1. A grease gun comprising a cylinder having a head provided with an integral worm housing, and an axial bore in the head, a screw shaft extending longitudinally and axially of the cylinder and formed with a stem portion engaging within the bore of the head, said screw shaft being also formed with an enlargement forming a collar and with a portion of rectangular form in cross section adjacent said collar, a worm wheel mounted upon the rectangular portion of the shaft in engagement with the collar, a wear plate interposed between the worm wheel and the inner wall of the head, means on the outer end of the shaft for securing the stem of the shaft within its bearing in the head with the worm wheel in contact with the wear plate and permitting free rotation of the shaft, a worm in the worm housing engaging the worm wheel, a crank for rotating the worm and a piston slidable within the cylinder and having an axial screw-threaded opening to engage the screw-threaded shaft.

2. A grease gun comprising a cylinder formed with an integral head portion provided with an axial bore and worm wheel chamber and with a transversely extending worm chamber, the opposite end of the cylinder being open, a closure for the open end of the cylinder and provided with a discharge nipple, a screw-threaded shaft extending longitudinally and axially of the cylinder with an unsupported free end at the discharge end of the cylinder and provided with a cylindrical stem engaging the bore in the head of the cylinder, said shaft being also provided with an integral portion forming a collar and a rectangular portion adjacent the collar, a worm wheel having an axial opening to fit the rectangular portion of the shaft and engage the collar, means for securing the shaft with its stem within the bearing bore of the head, and with said worm in engagement with the collar and within the worm wheel chamber of the head, a worm within the worm chamber of the head formed with a shaft extending transversely of the screw-threaded shaft and with the worm in engagement with the worm wheel, said worm shaft being mounted in bearings in the head with one end of the shaft extending therefrom and provided with a crank, and a piston in the cylinder having a screw-threaded axial opening to engage the screw-threaded shaft.

3. A grease gun comprising a cylinder formed with an integral head at one end, said head being formed with an axial worm wheel chamber and an axial bore through the head, said head being also formed with a worm chamber extending transversely of the head and cutting into the worm wheel chamber, a worm mounted in the worm chamber transversely of the head, a crank for operating the worm, a piston slidable longitudinally in the cylinder and provided with an axial screw-threaded opening, a cap to close the discharge end of the cylinder and provided with a discharge nipple, a screw-threaded shaft extending longitudinally and axially of the cylinder through the screw-threaded opening in the piston with an unsupported end at the discharge end of the cylinder, said shaft being formed with a cylindrical stem to engage the bearing bore in the head of the cylinder and also formed with an integral enlargement forming a collar and a portion of rectangular form in cross section adjacent the collar and adjacent the inner end of the cylindrical stem, a worm wheel having an axial opening to fit the rectangular portion of the shaft and to engage the collar and to mesh with the worm, a wear plate interposed between the worm wheel and the inner wall of the head, a wear plate to engage the outer wall of the head, means for securing the wear plates in place upon the head, and means on the outer end of the shaft to engage the outer wear plate and firmly hold the shaft in axial alinement within the cylinder and permit free rotation of the shaft within its bearing in the head.

In testimony whereof I affix my signature.

ALBERT J. FARMER.